(12) United States Patent
Peng et al.

(10) Patent No.: US 12,034,342 B2
(45) Date of Patent: Jul. 9, 2024

(54) ELECTRIC MACHINE AND ASSEMBLING METHOD FOR ELECTRIC MACHINE

(71) Applicant: BEIJING GOLDWIND SCIENCE & CREATION WINDPOWER EQUIPMENT CO., LTD., Beijing (CN)

(72) Inventors: Liang Peng, Beijing (CN); Chengqian Liu, Beijing (CN); Baofu Hu, Beijing (CN); Yanhui Li, Beijing (CN); Dong Wang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 385 days.

(21) Appl. No.: 17/615,370

(22) PCT Filed: Jan. 19, 2020

(86) PCT No.: PCT/CN2020/072975
§ 371 (c)(1),
(2) Date: Nov. 30, 2021

(87) PCT Pub. No.: WO2020/238265
PCT Pub. Date: Dec. 3, 2020

(65) Prior Publication Data
US 2022/0231557 A1    Jul. 21, 2022

(30) Foreign Application Priority Data

May 24, 2019    (CN) .......................... 201910440569.2

(51) Int. Cl.
*H02K 1/28* (2006.01)
*H02K 1/14* (2006.01)
(Continued)

(52) U.S. Cl.
CPC ................. *H02K 1/28* (2013.01); *H02K 1/14* (2013.01); *H02K 1/24* (2013.01); *H02K 7/085* (2013.01); *H02K 15/16* (2013.01)

(58) Field of Classification Search
CPC .. H02K 1/28; H02K 1/14; H02K 1/24; H02K 7/085; H02K 15/16; H02K 1/187;
(Continued)

(56) References Cited

U.S. PATENT DOCUMENTS

| 5,061,868 A | 10/1991 | Iwazaki et al. |
| 2008/0211236 A1* | 9/2008 | Appa ....................... H02K 1/24 |
| | | 310/78 |

(Continued)

FOREIGN PATENT DOCUMENTS

| CN | 1337770 A | 2/2002 |
| CN | 1547796 A | 11/2004 |

(Continued)

OTHER PUBLICATIONS

Australian Examination Report No. 1; Appln. No. 2020281866; dated Sep. 15, 2022.

(Continued)

*Primary Examiner* — Ahmed Elnakib
(74) *Attorney, Agent, or Firm* — Frank Gao, Esq.

(57) ABSTRACT

The disclosure relates to an electric machine and an assembling method for an electric machine. The electric machine includes: a shaft assembly including a first shaft, a second shaft coaxially disposed within an inner circumference of the first shaft, and a bearing disposed between the first shaft and the second shaft; a first revolving body coaxially connected to the first shaft, wherein the first revolving body includes an annular first adapter bracket, and a tubular structural portion extending in an axial direction is disposed at an inner circumference of the first adapter bracket; a (Continued)

second revolving body coaxially connected to the second shaft and disposed around an outer circumference of the first revolving body; and a guiding assembly disposed between the tubular structural portion and the first shaft to restrict a movement of the first revolving body relative to the first shaft in a circumferential direction and a radial direction.

20 Claims, 7 Drawing Sheets

(51) Int. Cl.
*H02K 1/24* (2006.01)
*H02K 7/08* (2006.01)
*H02K 15/16* (2006.01)

(58) Field of Classification Search
CPC ........ H02K 1/2786; H02K 1/30; H02K 7/003; H02K 7/1838; H02K 1/12; H02K 1/22; H02K 7/00; H02K 15/00; Y02E 10/72
USPC ...................................................... 310/40 R
See application file for complete search history.

(56) References Cited

U.S. PATENT DOCUMENTS

| | | | |
|---|---|---|---|
| 2009/0110554 A1* | 4/2009 | Dukovic | F03D 3/06 416/223 R |
| 2009/0134627 A1* | 5/2009 | Stiesdal | F03D 15/00 310/90 |
| 2009/0309438 A1 | 12/2009 | Horng et al. | |
| 2010/0045047 A1* | 2/2010 | Stiesdal | F03D 80/00 290/55 |
| 2011/0181147 A1 | 7/2011 | Horng | |
| 2013/0015748 A1 | 1/2013 | Takei et al. | |
| 2014/0265687 A1 | 9/2014 | Cheong et al. | |
| 2017/0260970 A1* | 9/2017 | Stiesdal | F03D 80/70 |
| 2022/0231557 A1* | 7/2022 | Peng | H02K 1/187 |

FOREIGN PATENT DOCUMENTS

| | | |
|---|---|---|
| CN | 101212151 A | 7/2008 |
| CN | 201153225 Y | 11/2008 |
| CN | 101615823 A | 12/2009 |
| CN | 101902090 A | 12/2010 |
| CN | 201956823 U | 8/2011 |
| CN | 101521414 B | 1/2013 |
| CN | 203104151 U | 7/2013 |
| CN | 103925296 A | 7/2014 |
| CN | 103944291 A | 7/2014 |
| CN | 104052204 A | 9/2014 |
| CN | 104380581 A | 2/2015 |
| CN | 204465189 U | 7/2015 |
| CN | 105305702 A | 2/2016 |
| CN | 103547794 B | 4/2016 |
| CN | 105745826 * | 7/2016 |
| CN | 105745826 A | 7/2016 |
| CN | 105827033 A | 8/2016 |
| CN | 106487155 A | 3/2017 |
| CN | 107040072 A | 8/2017 |
| CN | 107276273 A | 10/2017 |
| CN | 108233586 A | 6/2018 |
| CN | 207753507 U | 8/2018 |
| CN | 207977795 U | 10/2018 |
| CN | 109245351 A | 1/2019 |
| EP | 2063117 A1 | 5/2009 |
| ES | 2564053 A1 | 3/2016 |
| JP | 2004072974 A | 3/2004 |
| JP | 2006136094 A | 5/2006 |
| WO | 97/19506 A1 | 5/1997 |

OTHER PUBLICATIONS

First Chinese Office Action dated Feb. 8, 2022; Appln. 201910440569.2 (Concise Explanation of Relevance for CNOA1 in English only).
The Extended European Search Report dated May 24, 2022; Appln. No. 20814881.7.
Chinese Rejection Decision dated Jun. 27, 2022; Appln. No. 201910440569.2.
First Indian Office Action dated Jun. 22, 2022; Appln. No. 202117055236.
The Second Chinese Office Action dated Feb. 10, 2023; Appln. No. 201910440569.2.
Chinese Notice of Registration dated Oct. 27, 2023; Appln. No. 201910440569.2.
English Concise Expanation of Relevance for CNOA 3 dated Jul. 28, 2023; Appln. 201910440569.2.
The International Search Report mailed Apr. 22, 2020; PCT/CN2020/072975.
Australian Examination Report No. 2 dated Apr. 19, 2023; Appln. No. 2020281866.

* cited by examiner

ELECTRIC MACHINE AND ASSEMBLING METHOD FOR ELECTRIC MACHINE

CROSS-REFERENCE TO RELATED APPLICATION

This application is a National Stage of International Application No. PCT/CN2020/072975, filed on Jan. 19, 2020, which claims priority to Chinese Patent Application No. 201910440569.2, filed on May 24, 2019, both of which are incorporated herein by reference in their entireties.

FIELD

The disclosure relates to a technical field of electric machine, and in particular to an electric machine and an assembling method for an electric machine.

BACKGROUND

In large electric machines such as wind turbines, in order to ensure uniformity of an air gap between a stator and a rotor, an assembling coaxiality of the stator, the rotor and a shaft assembly is usually achieved by means of processing equipment. Due to a large number of components of the electric machine, in order to facilitate assembling, the components are usually manufactured only at a processing site, and then the respective components are transported to a wind power generation site and then assembled; therefore, it is also necessary to transport the processing equipment to the site, and after the assembling of the electric machine by means of the processing equipment, the processing equipment will be disassembled and transported back to a designated site, which increases the transportation cost and the assembling complexity.

SUMMARY

An object of the disclosure is to provide an electric machine and an assembling method for an electric machine, which can simplify the assembling process and reduce transportation cost.

In one aspect, the disclosure provides an electric machine including: a shaft assembly including a first shaft, a second shaft coaxially disposed within an inner circumference of the first shaft, and a bearing disposed between the first shaft and the second shaft: a first rotatable body coaxially connected to the first shaft, wherein the first rotatable body includes an annular first adapter bracket, and a tubular structural portion extending in an axial direction is disposed at an inner circumference of the first adapter bracket: a second rotatable body coaxially connected to the second shaft and disposed around and at an outer circumference of the first rotatable body: and a guiding assembly disposed between the tubular structural portion and the first shaft to restrict a movement of the first rotatable body relative to the first shaft in a circumferential direction and a radial direction.

In another aspect, the disclosure provides an assembling method for any of the aforementioned electric machines, which includes: disposing a first shaft around and at an outer circumference of a second shaft: disposing a tubular structural portion of a first rotatable body around and at an outer circumference of the first shaft through a guiding assembly: and connecting a second rotatable body coaxially with the second shaft so that the second rotatable body is disposed around and at an outer circumference of the first rotatable body.

The electric machine and the assembling method for the electric machine according to the disclosure provide the guiding assembly between the stator and the stationary shaft or between the rotor and the rotational shaft, which improves a coaxiality of the stator or rotor and the shaft assembly and then improves an assembling quality of the electric machine: and since the guiding assembly is adopted to replace the processing equipment in prior art, it simplifies the assembling process of the electric machine and also reduces the assembling cost of the electric machine.

BRIEF DESCRIPTION OF THE DRAWINGS

The disclosure can be better understood from the following description of the specific embodiments of the disclosure in conjunction with the accompanying drawings, wherein other features, objects and advantages of the disclosure will be more apparent by reading the following detailed description of the non-limiting embodiments with reference to the accompanying drawings, and same or similar reference signs indicate same or similar features.

REFERENCE SIGNS IN THE DRAWINGS

1—first rotatable body; 11—first adapter bracket; 111—first inner flange; 112—tubular structural portion; 113—second double flange; 12—first module; 121—stator module bracket; 122—iron core; 123—first double flange;
2—second rotatable body; 21—second adapter bracket; 211—second inner flange; 22—second module;

3—shaft assembly; 31—first shaft; 311—first end surface; 312—second end surface; 313—first outer flange; 32—second shaft; 321—second outer flange;
4—guiding assembly; 41—first inserting portion; 411—first guiding rib; 412—second guiding rib; 42—first socketing portion; 43—second inserting portion; 44—second socketing portion;
51—adapter portion; 52—connecting arm; 53—rotor ring; 53a—mounting surface; 53b—mounting slot;
6—magnetic pole module; 6a—substrate; 6b—magnet steel; 6c—mounting portion.

DETAILED DESCRIPTION

Features and exemplary embodiments according to various aspects of the disclosure will be described in detail below. Many specific details are disclosed in the following detailed description to facilitate a fully understanding of the disclosure. However, it will be apparent to those skilled in the art that the disclosure can be implemented without some of these specific details. The following description of embodiments is intended only to provide a better understanding of the disclosure by illustrating examples of the disclosure. The disclosure is by no means limited to any of the specific configurations and algorithms discussed below, but covers any modifications, replacements, and improvements to the elements, components, and algorithms without departing from the spirit of the disclosure. In the accompanying drawings and the following description, structures and techniques that are well known are not shown in order to avoid unnecessary ambiguity in the disclosure.

For a better understanding of the disclosure, electric machines and assembling methods for electric machines according to embodiments of the disclosure are described in detail below in conjunction with FIGS. 1 to 14. In the disclosure, the term "radial direction" refers to a direction of a diameter of a rotatable body of the electric machine, the term "axial direction" refers to a direction of an axis of the rotatable body of the electric machine, and the term "circumferential direction" refers to a direction of a circumference of the rotatable body of the electric machine.

Figure 1:
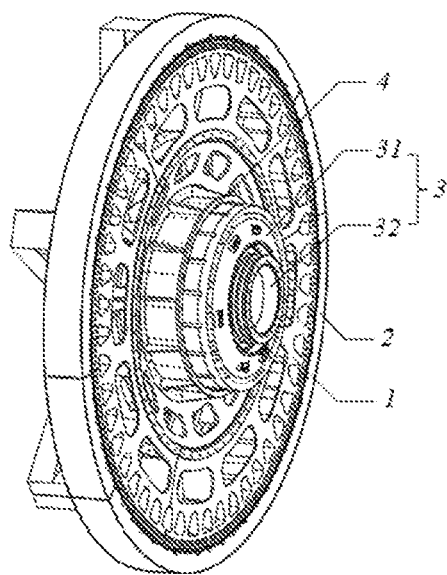
FIG. 1 is a three-dimensional schematic diagram of an electric machine according to embodiments of the disclosure.
Figure 2:
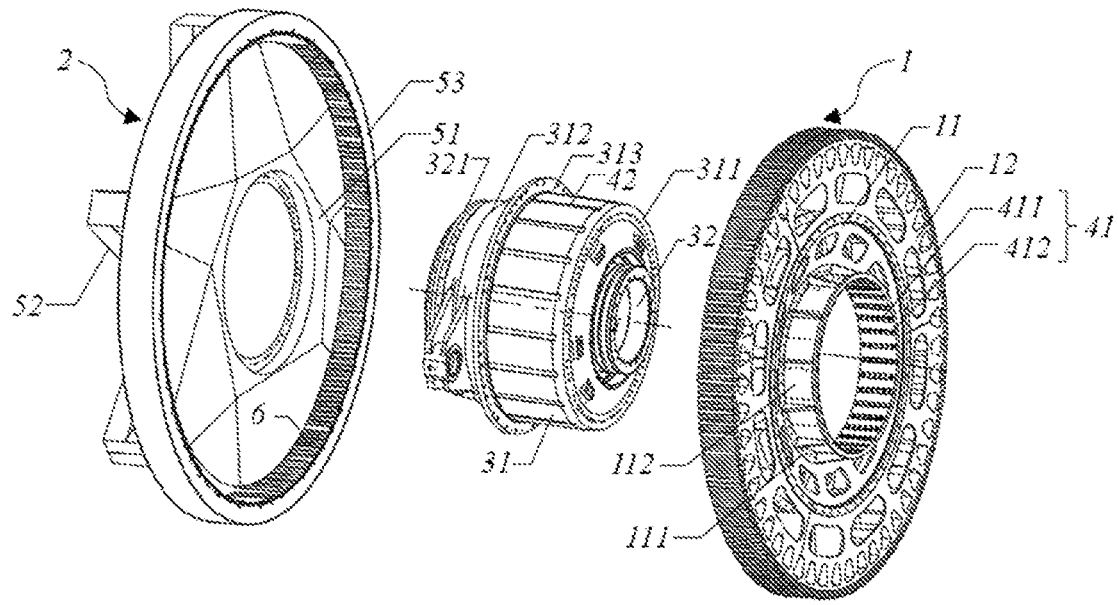
FIG. 2 is an exploded schematic diagram of the electric machine shown in FIG. 1.
Figure 3:
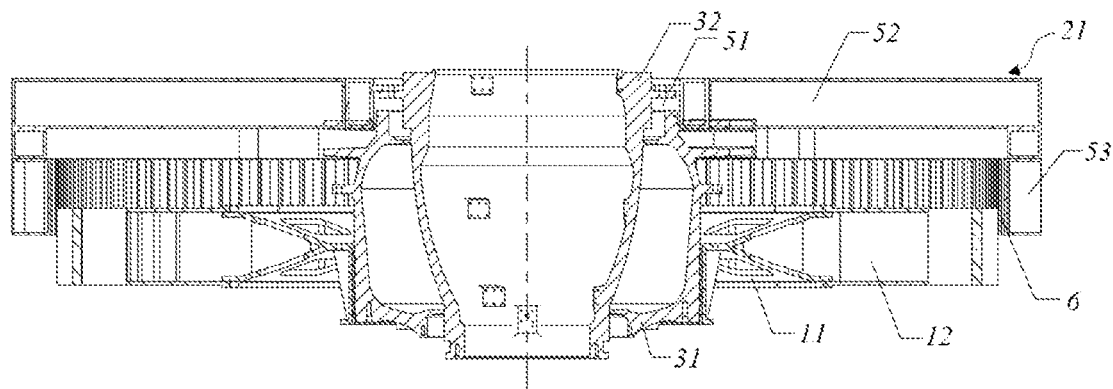
FIG. 3 is a longitudinal sectional view of the electric machine shown in FIG. 1.

Referring to FIGS. 1 to 3, the disclosure provides an electric machine including: a first rotatable body 1, a second rotatable body 2, a shaft assembly 3 and a guiding assembly 4.

The shaft assembly 3 includes a first shaft 31, a second shaft 32 coaxially disposed within an inner circumference of the first shaft 31, and a bearing (not shown in the drawings) disposed between the first shaft 31 and the second shaft 32. An inner ring of the bearing is disposed at one of the first shaft 31 and the second shaft 32, and an outer ring of the bearing is disposed at the other of the first shaft 31 and the second shaft 32, such that the first shaft 31 can be rotated relative to the second shaft 32 about a central axis of the second shaft 32: and the bearing can be fixed in the shaft assembly 3 through, for example, a bearing retaining ring, such that the first shaft 31 and the second shaft 32 are unmovable with respect to each other in the axial direction.

The first rotatable body 1 is coaxially connected to the first shaft 31, and the first rotatable body 1 includes an annular first adapter bracket 11, and a tubular structural portion 112 extending in an axial direction is disposed at an inner circumference of the first adapter bracket 11.

The second rotatable body 2 is coaxially connected to the second shaft 32, and the second rotatable body 2 is disposed around and at an outer circumference of the first rotatable body 1.

The guiding assembly 4 is disposed between the tubular structural portion 112 and the first shaft 31 to restrict a movement of the first rotatable body 1 relative to the first shaft 31 in a circumferential direction and a radial direction.

In some embodiments, the first rotatable body 1 is a stator, the first shaft 31 is a stationary shaft, the second rotatable body 2 is a rotor, and the second shaft 32 is a rotational shaft. In other words, the electric machine has a structure with an inner stator and an outer rotor.

In some embodiments, the first rotatable body 1 is a rotor, the first shaft 31 is a rotational shaft, the second rotatable body 2 is a stator, and the second shaft 32 is a stationary shaft. In other words, the electric machine has a structure with an inner rotor and an outer stator.

Thus, the guiding assembly 4 can improve a coaxiality of the stator and the rotational shaft or a coaxiality of the rotor and the rotational shaft, which then ensures a uniform air gap between the stator and the rotor and improves an assembling quality of the electric machine.

The electric machine according to the disclosure provides the guiding assembly 4 between the stator and the stationary shaft or between the rotor and the rotational shaft, which improves a coaxiality of the stator or rotor and the shaft assembly 3 and then improves an assembling quality of the electric machine: and since the guiding assembly 4 is adopted to replace the processing equipment in prior art, it simplifies the assembling process of the electric machine and also reduces the assembling cost of the electric machine.

In order to facilitate the description, the specific structure of the electric machine according to embodiments of the disclosure will be described in further detail below, by taking the electric machine having a structure with an inner stator and an outer rotor as an example.

Figure 4:
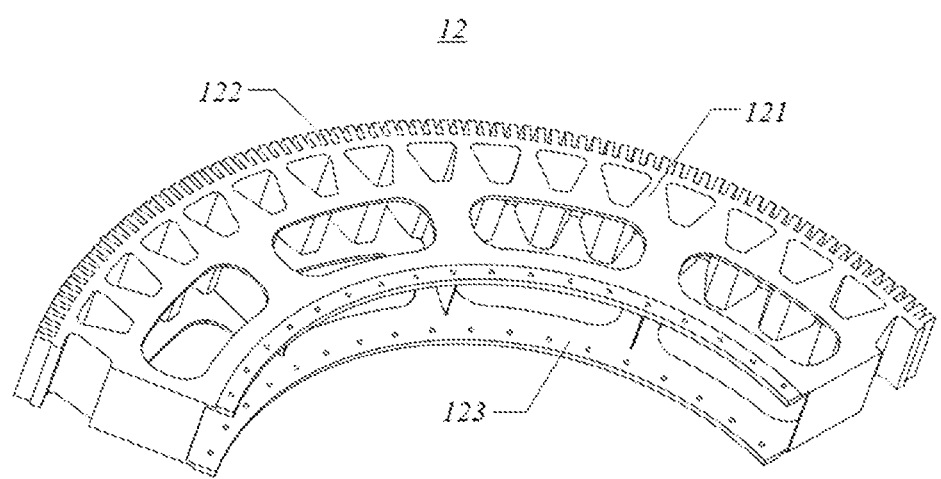
FIG. 4 is a partial cross-sectional view of a stator module in a stator shown in FIG. 2.
Figure 5:
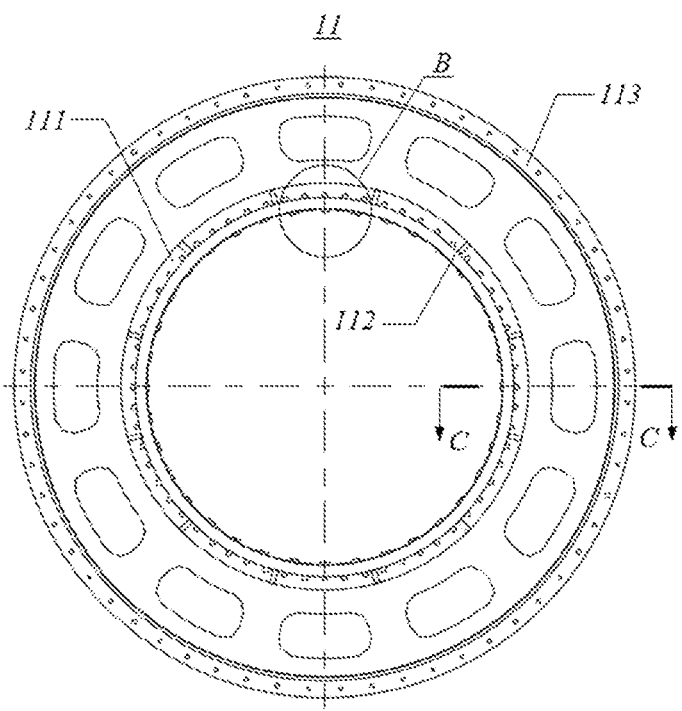
FIG. 5 is a schematic top view of a first adapter bracket in the stator shown in FIG. 2.

Referring to FIGS. 2, 4 and 5, the first rotatable body 1 is a stator, and the first shaft 31 is a stationary shaft. The first rotatable body 1 also includes a first module 12 disposed around and at an outer circumference of the first adapter bracket 11; the first module 12 is a stator module of the electric machine: and the stator module includes a stator module bracket 121, an iron core 122 disposed at an outer circumference of the stator module bracket 121, and a stator winding (not shown in the drawings) mounted on the iron core 122.

The first adapter bracket 11 and the stator module bracket 121 are usually made of steel materials such as Q235 steel, which is shaped in a welding, casting or other process and then machined. Optionally, the stator module bracket 121 has an internally hollow structure to improve its stiffness and also reduce its weight. A first double flange 123 is disposed at an inner circumference of the stator module bracket 121, and a group of bolt holes are formed at the first double flange 123: a second double flange 113 is disposed at the outer circumference of the first adapter bracket 11, and a group of bolt holes are formed at the second double flange 113: and the stator module bracket 121 and the first adapter bracket 11 may be connected together through a cooperation of the first double flange 123 and the second double flange 113. The iron core 122 is usually made of laminated silicon steel sheets, and winding coils are installed in slots of the iron core 122: and the iron core 122 is mounted to dovetail slots (not shown in the drawings) on the outer circumference of the stator module bracket 121 and thus fixed to the stator module bracket 121.

Referring to FIGS. 6 to 9, the guiding assembly 4 includes a first inserting portion 41 and a first socketing portion 42 that are engaged with each other, one of the first inserting portion 41 and the first socketing portion 42 is disposed at an inner circumference of the tubular structural portion 112 and extends in the axial direction, and the other of the first inserting portion 41 and the first socketing portion 42 is disposed at an outer circumference of the first shaft 31 and extends in the axial direction. There may be multiple first inserting portions 41 and multiple first socketing portions 42.

A case in which the first inserting portion 41 is disposed at the inner circumference of the tubular structural portion 112 is taken as an example, the first inserting portion 41 includes a first guiding rib 411 protruding in the radial direction from the inner circumference of the tubular structural portion 112: and the first inserting portion 42 is a first guiding groove recessed in the radial direction from the outer circumference of the first shaft 31, and the first guiding groove has a width along the circumferential direction matched with a width of the first guiding rib 411 along the circumferential direction, so that a movement of the tubular structural portion 112 of the stator in the circumferential direction relative to the stationary shaft is restricted, which prevents a case in which a first inner flange 111 and a first outer flange 313 cannot be assembled with their centers being aligned due to insufficient coaxiality and accuracy after the stator and rotor have been assembled with one being surrounded by another.

Furthermore, the first inserting portion 41 includes a second guiding rib 412 protruding in the radial direction from the inner circumference of the tubular structural portion 112, the second guiding rib 412 has an inner diameter larger than an inner diameter of the first guiding rib 411, and the second guiding rib 412 and the first guiding rib 411 are alternately arranged in the circumferential direction on the inner circumference, and the outer circumference of the first shaft 31 has an outer diameter matched with the inner diameter of the second guiding rib 412. The first shaft 31 and the inner circumference of the second guide 412 form a shaft-hole fit, and its tolerance fit here is preferably a clearance fit to restrict the movement of the tubular structural portion 112 of the stator in the radial direction relative to the stationary shaft.

Furthermore, the first guiding rib 411 and the second guiding rib 412 can be connected to an inner wall of the tubular structural portion 112 through countersunk screws or in other ways. The first guiding rib 411 and the second guiding rib 412 can be made of engineering plastics, metals such as aluminum, or composite materials such as phenolic laminated sheet. Herein, it would be beneficial that the materials of the first guiding rib 411 and the second guiding rib 412 are different from the material of the first shaft 31 to avoid crawling phenomenon which occurs when the first shaft 31 slides relative to the first guiding rib 411 and the second guiding rib 412.

Furthermore, a first inner flange 111 is further disposed at an axial end of the tubular structural portion 112 of the first rotatable body 1 near the first adapter bracket 11. The first inner flange 111 is a single flange, a group of bolt holes are formed at the single flange for connecting with the first shaft 31.

The first shaft 31 is a stationary shaft, the first shaft 31 is usually made of steel materials such as low carbon steel, ductile iron, etc. which is shaped in a welding, casting or other process and then machined. The first shaft 31 includes a first end surface 311 and a second end surface 312 opposite to each other in its axial direction, a first outer flange 313 is disposed at the outer circumference of the first shaft 31 at a predetermined distance from the first end surface 311, and the tubular structural portion 112 and the first shaft 31 are connected together through a cooperation of the first inner flange 111 and the first outer flange 313. The cooperation of the first inner flange 111 and the first outer flange 313 may, for example, be a connection with a bolt and a stop.

In order to further improve the coaxiality of the stator and the shaft assembly, the guiding assembly 4 also includes a second inserting portion 43 and a second socketing portion 44 that are engaged with each other, the second inserting portion 43 is disposed at the outer circumference of the first shaft 31 near the first outer flange 313, the second socketing portion 44 is disposed at the inner circumference of the tubular structural portion 112 near the first inner flange 111, and the second socketing portion 44 has an inner diameter D2 larger than an inner diameter D1 of the first inserting portion 41.

Furthermore, the second socketing portion 44 is formed by protruding in the radial direction from the inner circumference of the tubular structural portion 112, the second inserting portion 43 is formed by protruding in the radial direction from the outer circumference of the first shaft 31, an outer circumference of the second inserting portion 43 is matched with an inner circumference of the second socketing portion 44, and a fitting precision of the second inserting portion 43 and the second socketing portion 44 is higher than a fitting precision of the first inserting portion 41 and the first socketing portion 42. For example, if the shaft-hole fitting precision of the first inserting portion 41 and the first socketing portion 42 is H9/g9, the shaft-hole fitting precision of the second inserting portion 43 and the second socketing portion 44 is H7/f7.

The second inserting portion 43 is obtained by machining such as turning at the outer circumference of the first shaft 31, and the inner circumference of the second socketing portion 44 and the second inserting portion 43 form a shaft-hole fit, and its tolerance fit here is preferably a clearance fit. In order to facilitate smoothly inserting of the first shaft 31 into the tubular structural portion 112, the clearance between the first inserting portion 41 and the first socketing portion 42 needs to be chosen to be large.

In order to reduce a radial error between the stator and the stationary shaft after they are finally assembled, when the rotor and the rotational shaft are assembled in place, the second inserting portion 43 can be pulled into the second socketing portion 44 when the bolts are connected at the first inner flange 111, which ensures that the coaxiality of the final assembly of the stator and the shaft assembly is at a high precision level.

Figure 10:
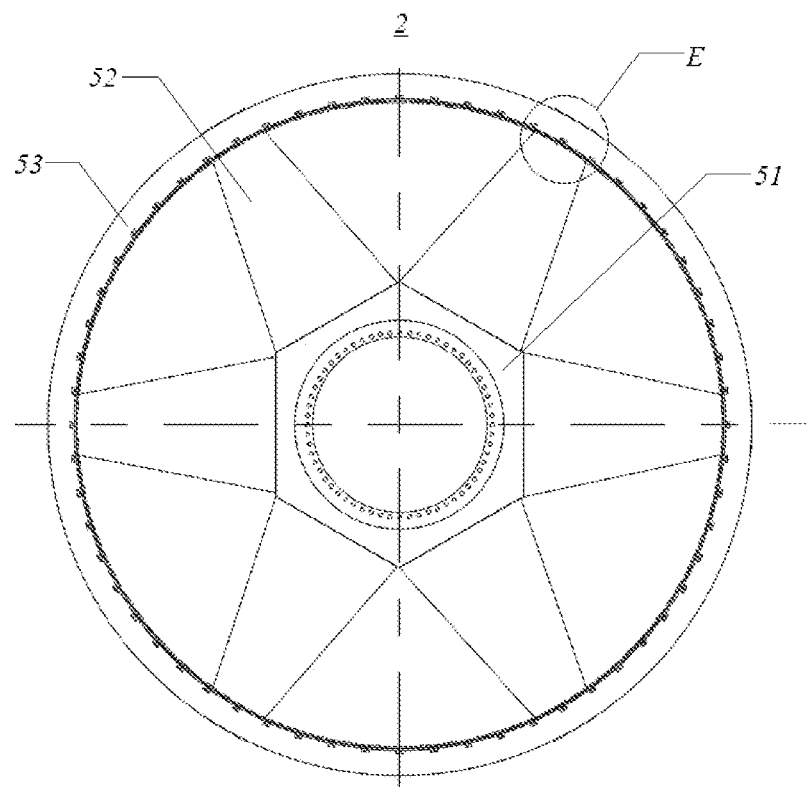
FIG. 10 is a schematic top view of a rotor shown in FIG. 2.
Figure 11:
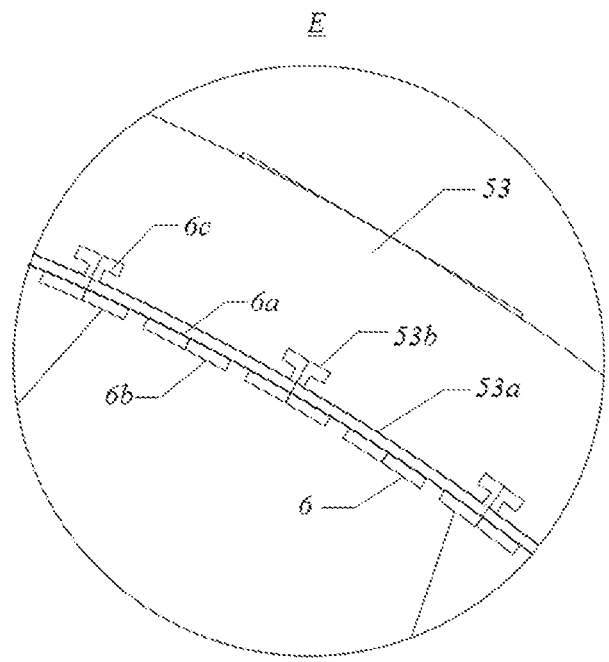
FIG. 11 is an enlarged schematic diagram of a zone E of the rotor shown in FIG. 10.
Figure 12:
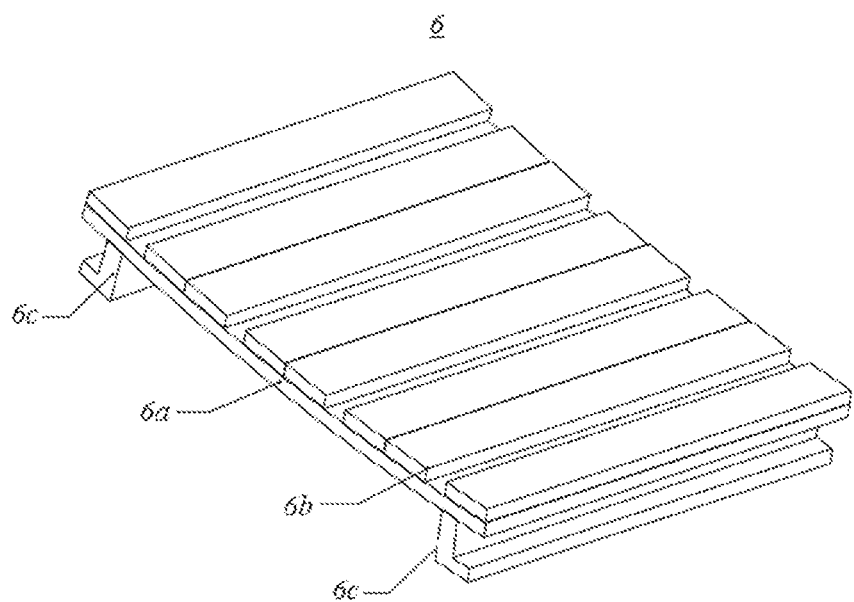
FIG. 12 is a schematic diagram of a magnetic pole module in the rotor shown in FIG. 10.

Referring to FIGS. 10 to 12, the second rotatable body 2 includes an annular second adapter bracket 21 and a second module 22 disposed at an outer circumference of the second adapter bracket 21, a second inner flange 211 is disposed at an inner circumference of the second adapter bracket 21, a second outer flange 321 is disposed at the outer circumference of the second shaft 32, and the second rotatable body 2 and the second shaft 32 are connected together through a cooperation of the second inner flange 211 and the second outer flange 321.

Herein, the second rotatable body 2 is a rotor, the second shaft 32 is a rotational shaft, and the second shaft 32 is usually made of steel materials such as low carbon steel, ductile iron, etc., which is shaped in a welding, casting or other process and then machined. The second inner flange 211 of the second adapter bracket 21 and the second outer flange 321 are connected with bolts and stops so that the rotor and the rotational shaft are connected together. The second adapter bracket 21 is usually made of steel materials such as Q235 steel, which is shaped in a welding, casting or other process and then machined.

The second adapter bracket 21 is a rotor bracket, and the second module 22 includes a plurality of magnetic pole modules 6: and the rotor bracket includes an adapter portion 51, two or more connecting arms 52 distributed radially on an outer circumference of the adapter portion 51, and a rotor ring 53 arranged coaxially with the two or more connecting arms 52; and the magnetic pole modules 6 are disposed at a mounting surface 53a of the rotor ring 53. The adapter portion 51, the connecting arms 52 and the rotor ring 53 can be fixed together by means of flange bolt connection, etc.

Furthermore, each of the rotor ring 53 and the connecting arms 52 are provided as a hollow internal structural member, which improves the stiffness of the rotor bracket. In particular, the internally hollow connecting arm 52 can theoretically prevent a problem of magnetic pole attraction at the air gap between the rotor and the stator when the rotor is being mounted around the outer circumference of the stator.

Furthermore, a plurality of mounting slots 53b extending in the axial direction are disposed at the mounting surface 53a of the rotor ring 53 at intervals: with respect to the electric machine having a structure with an inner stator and an outer rotor, the mounting surface 53a is the inner circumference of the rotor ring 53. The magnetic pole module 6 includes a substrate 6a and at least one magnet steel 6b disposed at the substrate 6a, and mounting portions 6c for matching with the mounting slots 53b are disposed at a side of the substrate 6a away from the magnet steel 6b.

The magnetic pole module 6 is an excitation source of the electric machine, in which direct current coil excitation or permanent magnet excitation is commonly used: and permanent magnet excitation is used as an example in embodiments of the disclosure. The magnetic pole module 6 can be prefabricated at the factory. Herein, the magnet steel 6b is made of hard magnetic material such as NdFeB permanent magnet material, and several small-sized magnet steels 6b are assembled in the axial direction to form the magnetic pole module 6. The magnet steels 6b are fixed to the substrate 6a by gluing, mechanical connection such as screw connection, etc. The surface of the magnet steel 6 is protected by glue injection, magnetic pole boxes, etc., to isolate it from the outside air and reduce the risk of failure. The substrate 6a is made of ferromagnetic materials such as low carbon steel, electric iron, silicon steel, etc. by machining, which provides a magnetic flux path between adjacent magnetic pole modules 6.

The mounting portion 6c of the substrate 6a is made of ferromagnetic materials such as low carbon steel, electric iron, silicon steel, etc. by machining, and can be fixed to the substrate 6a by bolting, welding, etc.: or the mounting portion 6c may be a part of the substrate 6a: and the mounting portion 6c has a shape matching with that of the mounting slot 53b of the rotor ring 53 to form a sliding rail structure that can move in the axial direction, so that the magnetic pole module 6 can be conveniently mounted to the mounting surface 53a of the rotor ring 53 and thus arranged opposite to the iron core 122 and the stator winding of the stator to form a uniform air gap.

It will be understood that the above structure of the guiding assembly 4 can also applied to an electric machine having a structure with an inner rotor and an outer stator, and then the guiding assembly 4 is disposed between the rotor and the rotational shaft: in other words, the first rotatable body 1 is a rotor, the first shaft 31 is a rotational shaft, the second rotatable body 2 is a stator, and the second shaft 32 is a stationary shaft.

Figure 13:
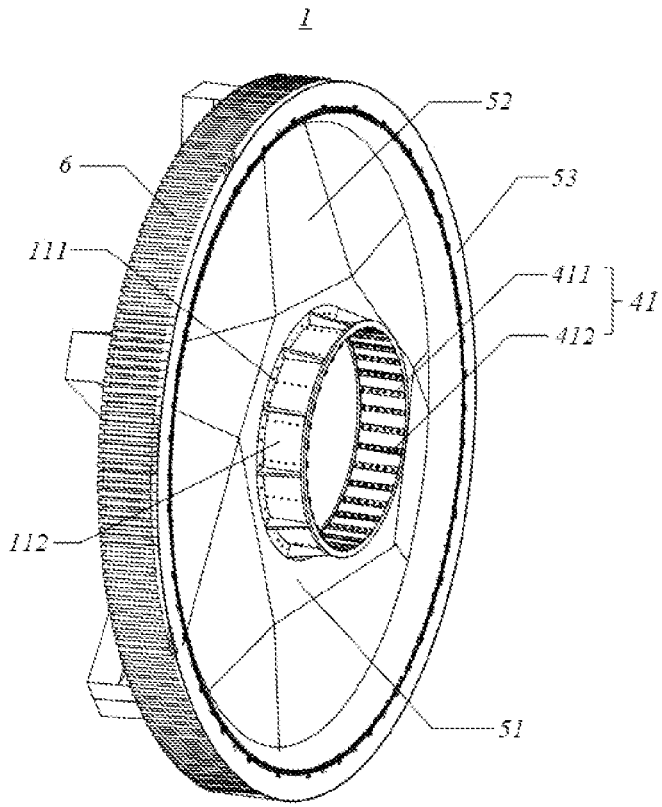
FIG. 13 is a schematic diagram of a rotor of an electric machine according to embodiments of the disclosure.

Referring to FIG. 13, a structural schematic diagram of a rotor of an electric machine having a structure with an inner rotor and an outer stator is shown. The rotor includes an annular first adapter bracket 11 and a plurality of magnetic pole modules 6 disposed at an outer circumference of the first adapter bracket 11, a first inner flange 111 and a tubular structural portion 112 extending in the axial direction from the first inner flange 111 are disposed at an inner circumference of the first adapter bracket 11.

Figure 8:
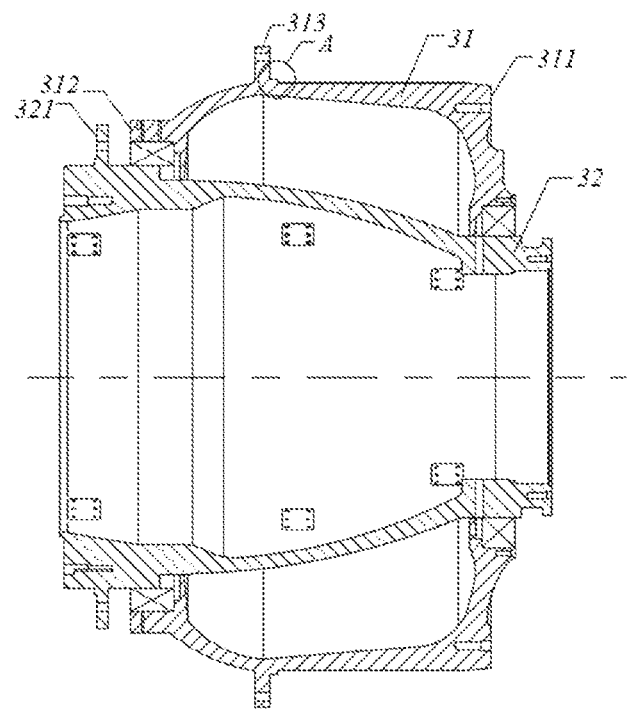
FIG. 8 is a schematic diagram of an assembled structure of a stationary shaft and a rotational shaft in the electric machine shown in FIG. 2.
Figure 9:
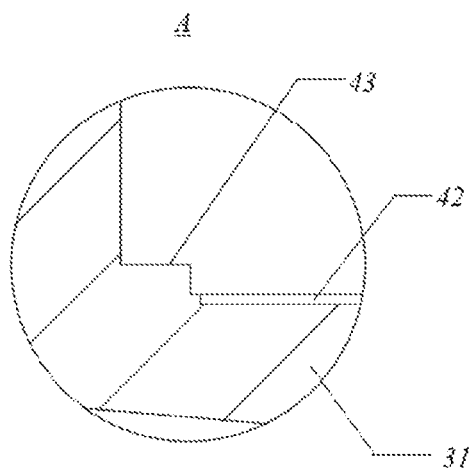
FIG. 9 is an enlarged schematic view of a zone A of the stationary shaft shown in FIG. 8.

Accordingly, the first shaft 31 in FIG. 8 is a rotational shaft, and the guiding assembly 4 is disposed between the tubular structural portion 112 of the rotor and the rotational shaft to restrict a movement of the rotor relative to the rotational shaft in the circumferential direction and the radial direction. A first outer flange 313 is disposed at an outer circumference of the rotational shaft, and the tubular structural portion 112 and the rotational shaft are connected together through a cooperation of the first inner flange 111 and the first outer flange 313.

Figure 6:
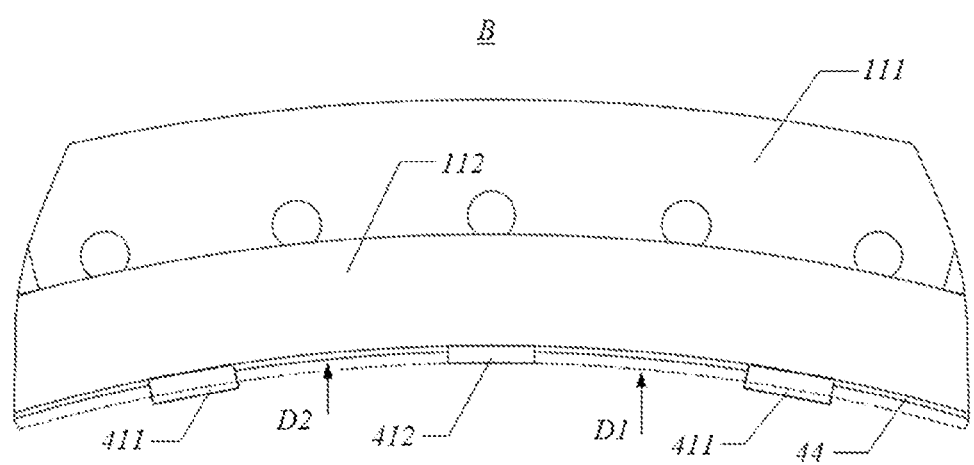
FIG. 6 is an enlarged schematic diagram of a zone B in the first adapter bracket shown in FIG. 5.
Figure 7:
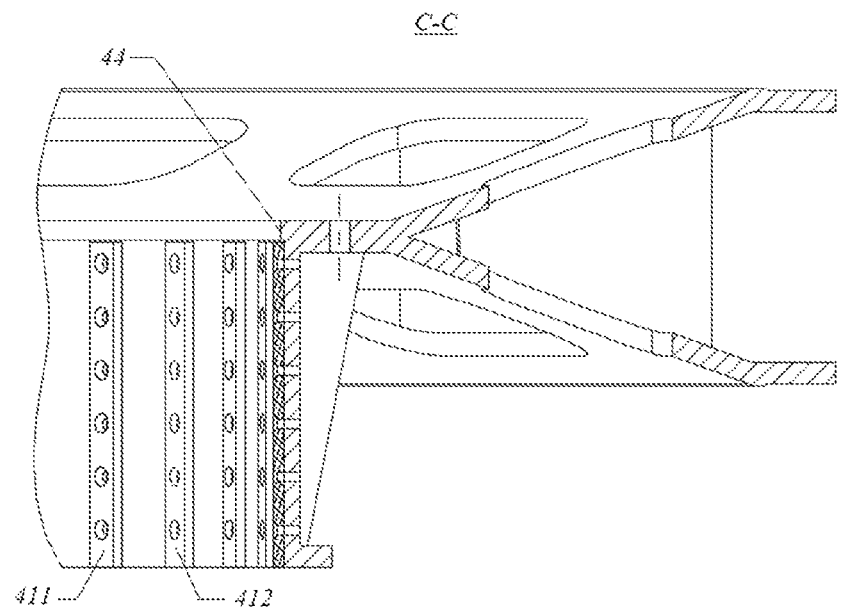
FIG. 7 is a schematic cross-sectional view of the first adapter bracket shown in FIG. 5 along a C-C direction.

Furthermore, similar to the structure in FIGS. 6 and 7, the guiding assembly 4 includes a first inserting portion 41 and a first socketing portion 42 that are engaged with each other, one of the first inserting portion 41 and the first socketing portion 42 is disposed at an inner circumference of the tubular structural portion 112 and extends in the axial direction, and the other of the first inserting portion 41 and the first socketing portion 42 is disposed at an outer circumference of the first shaft 31 and extends in the axial direction. There may be multiple first inserting portions 41 and multiple first socketing portions 42.

The guiding assembly 4 also includes a second inserting portion 43 and a second socketing portion 44 that are engaged with each other, the second inserting portion 43 is disposed at the outer circumference of the first shaft 31 near the first outer flange 313, the second socketing portion 44 is disposed at the inner circumference of the tubular structural portion 112 near the first inner flange 111, and the second socketing portion 44 has an inner diameter D2 larger than an inner diameter D1 of the first inserting portion 41.

Other structures of the guiding assembly 4 are similar to the aforementioned electric machine having a structure with an inner stator and an outer rotor to ensure that the coaxiality error of the rotor and the shaft assembly which have been finally assembled is at a high precision level, and will not be described again.

Furthermore, the rotor bracket includes an adapter portion 51, two or more connecting arms 52 distributed radially on an outer circumference of the adapter portion 51, and a rotor ring 53 arranged coaxially with the two or more connecting arms 52: magnetic pole modules 6 are disposed at a mounting surface 53a of the rotor ring 53: and with respect to the electric machines having a structure with an inner rotor and an outer stator, the mounting surface 53a is an outer circumference of the rotor ring 53.

Furthermore, the stator structure is similar to the stator structure in FIGS. 4 and 5, with the difference that there is no tubular structural portion 112 at the inner circumference of the first adapter bracket 11, the iron core 122 is disposed at the inner circumference of the stator module bracket 121, and the stator winding is mounted on the iron core 122 so as to be disposed opposite to the magnetic pole module 6 at the outer circumference of the rotor bracket to form a uniform air gap.

Furthermore, each of the rotor ring 53 and the connecting arms 52 are provided as a hollow internal structural member, which improves the stiffness of the rotor bracket. In particular, the internally hollow connecting arm 52 can theoretically prevent a problem of magnetic pole attraction at the air gap between the rotor and the stator when the stator is being mounted around the outer circumference of the rotor.

Furthermore, for an electric machine with a large diameter, when a maximum diameter of its stator or rotor exceeds a road transportation limit of 5 m, it is necessary to prefabricate the stator and the rotor in a factory, and divide the stator into several stator sections and divide the rotor into several rotor sections before transportation. Herein, a maximum chord length of each stator section is smaller than an inner diameter of a paint dipping tank in the factory in order to ensure processing requirements of the stator winding. To facilitate transportation, maximum widths of the stator section and the rotor section are smaller than the road transportation limit. After being transported to an assembling site, respective stator sections are then assembled into the stator, and respective rotor sections are assembled into the rotor.

Figure 14:
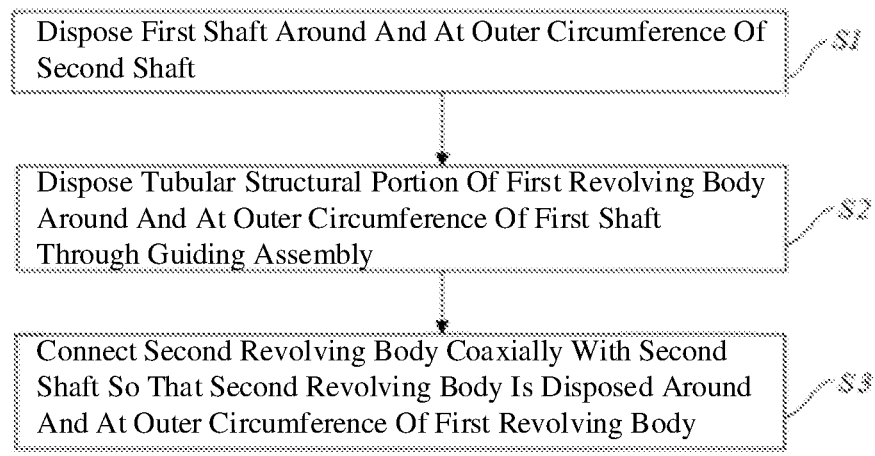
FIG. 14 is a flowchart of an assembling method for an electric machine according to embodiments of the disclosure.

Referring to FIG. 14, embodiments of the disclosure also provide an assembling method for any of the electric machines as described above, wherein the assembling method includes:

Step S1: disposing the first shaft 31 around and at the outer circumference of the second shaft 32:

Step S2: disposing the tubular structural portion 112 of the first rotatable body 1 around and at the outer circumference of the first shaft 31 through the guiding assembly 4.

Step S3: connecting the second rotatable body 2 coaxially with the second shaft 32 so that the second rotatable body 2 is disposed around and at the outer circumference of the first rotatable body 1.

Herein, the first rotatable body 1 is a stator, the first shaft 31 is a stationary shaft, the second rotatable body 2 is a rotor, and the second shaft 32 is a rotational shaft: or the first rotatable body 1 is a rotor, the first shaft 31 is a rotational shaft, the second rotatable body 2 is a stator, and the second shaft 32 is a stationary shaft.

Alternatively, the electric machine and the assembling method for the electric machine according to exemplary embodiments described above may be applied to various devices where an electric machine is required, such as but not limited to, wind turbines.

Those skilled in the art should understand that the above-mentioned embodiments are all illustrative but not restrictive. Different technical features in different embodiments can be combined to achieve beneficial effects. Those skilled in the art should understand and implement other modified embodiments of the disclosed embodiments after studying the drawings, description, and claims. In the claims, the term "comprise" does not exclude other devices or steps: the article is intended to include one or more articles when not modified by a quantifier, and may be used interchangeably with "one or more articles": the terms "first", "second" or the like are used to designate names and are not intended to indicate any particular order. Any reference sign in the claims should not be construed as limiting the scope of protection. The functions of multiple parts in the claims may be implemented by a single hardware or software module. The presence of certain technical features in different dependent claims does not mean that these technical features cannot be combined for beneficial effect.

What is claimed is:

1. An electric machine comprising:
    a shaft assembly comprising a first shaft, a second shaft coaxially disposed within an inner circumference of the first shaft, and a bearing disposed between the first shaft and the second shaft;
    a first rotatable body coaxially connected to the first shaft, wherein the first rotatable body comprises an annular first adapter bracket, and a tubular structural portion extending in an axial direction is disposed at an inner circumference of the first adapter bracket;
    a second rotatable body coaxially connected to the second shaft and disposed around and at an outer circumference of the first revolving rotatable body; and
    a guiding assembly disposed between the tubular structural portion and the first shaft to restrict a movement of the first rotatable body relative to the first shaft in a circumferential direction and a radial direction,
    wherein one of the first rotatable body and the second rotatable body is stationary while the other one is rotary.

2. The electric machine according to claim 1, wherein the first rotatable body is a stator, the first shaft is a stationary shaft, the second rotatable body is a rotor, and the second shaft is a rotational shaft; or the first rotatable body is a rotor, the first shaft is a rotational shaft, the second rotatable body is a stator, and the second shaft is a stationary shaft.

3. The electric machine according to claim 2, wherein the guiding assembly comprises a first inserting portion and a first socketing portion that are engaged with each other, one of the first inserting portion and the first socketing portion is disposed at an inner circumference of the tubular structural portion and extends in the axial direction, and the other of the first inserting portion and the first socketing portion is disposed at an outer circumference of the first shaft and extends in the axial direction.

4. The electric machine according to claim 3, wherein the first inserting portion comprises a first guiding rib protruding in the radial direction from the inner circumference of the tubular structural portion; and
    the first socketing portion is a first guiding groove recessed in the radial direction from the outer circumference of the first shaft, and the first guiding groove has a width along the circumferential direction matched with a width of the first guiding rib along the circumferential direction.

5. The electric machine according to claim 4, wherein the first inserting portion further comprises a second guiding rib protruding in the radial direction from the inner circumference of the tubular structural portion, the second guiding rib has an inner diameter larger than an inner diameter of the first guiding rib, and the second guiding rib and the first guiding rib are alternately arranged in the circumferential direction on the inner circumference; and
    the outer circumference of the first shaft has an outer diameter matched with the inner diameter of the second guiding rib.

6. The electric machine according to claim 3, wherein a first inner flange is further disposed at an axial end of the tubular structural portion near the first adapter bracket;
    the first shaft comprises a first end surface and a second end surface opposite to each other in its axial direction, a first outer flange is disposed at the outer circumference of the first shaft at a predetermined distance from the first end surface; and
    the tubular structural portion and the first shaft are connected together through a cooperation of the first inner flange and the first outer flange.

7. The electric machine according to claim 6, wherein the guiding assembly further comprises a second inserting portion and a second socketing portion that are engaged with each other, the second inserting portion is disposed at the outer circumference of the first shaft near the first outer flange, the second socketing portion is disposed at the inner circumference of the tubular structural portion near the first inner flange, and the second socketing portion has an inner diameter larger than an inner diameter of the first inserting portion.

8. The electric machine according to claim 7, wherein the second socketing portion is formed by protruding in the radial direction from the inner circumference of the tubular structural portion, the second inserting portion is formed by protruding in the radial direction from the outer circumference of the first shaft, an outer circumference of the second inserting portion is matched with an inner circumference of the second socketing portion, and a fitting precision of the second inserting portion and the second socketing portion is higher than a fitting precision of the first inserting portion and the first socketing portion.

9. The electric machine according to claim 3, wherein the second rotatable body comprises an annular second adapter bracket, a second inner flange is disposed at an inner circumference of the second adapter bracket, a second outer flange is disposed at the outer circumference of the second shaft, and the second rotatable body and the second shaft are connected together through a cooperation of the second inner flange and the second outer flange.

10. The electric machine according to claim 9, wherein the first adapter bracket or the second adapter bracket is a rotor bracket; the rotor further comprises a plurality of magnetic pole modules disposed at an outer circumference of the rotor bracket; the rotor bracket comprises an adapter portion, two or more connecting arms distributed radially on an outer circumference of the adapter portion, and a rotor ring arranged coaxially with the two or more connecting arms; the magnetic pole modules are disposed at a mounting surface of the rotor ring; and each of the rotor ring and the connecting arms are provided as a hollow internal structural member.

11. The electric machine according to claim 1, wherein the guiding assembly comprises a first inserting portion and a first socketing portion that are engaged with each other, one of the first inserting portion and the first socketing portion is disposed at an inner circumference of the tubular structural portion and extends in the axial direction, and the other of the first inserting portion and the first socketing portion is disposed at an outer circumference of the first shaft and extends in the axial direction.

12. The electric machine according to claim 11, wherein the first inserting portion comprises a first guiding rib protruding in the radial direction from the inner circumference of the tubular structural portion; and
the first socketing portion is a first guiding groove recessed in the radial direction from the outer circumference of the first shaft, and the first guiding groove has a width along the circumferential direction matched with a width of the first guiding rib along the circumferential direction.

13. The electric machine according to claim 12, wherein the first inserting portion further comprises a second guiding rib protruding in the radial direction from the inner circumference of the tubular structural portion, the second guiding rib has an inner diameter larger than an inner diameter of the first guiding rib, and the second guiding rib and the first guiding rib are alternately arranged in the circumferential direction on the inner circumference; and
the outer circumference of the first shaft has an outer diameter matched with the inner diameter of the second guiding rib.

14. The electric machine according to claim 11, wherein a first inner flange is further disposed at an axial end of the tubular structural portion near the first adapter bracket;
the first shaft comprises a first end surface and a second end surface opposite to each other in its axial direction, a first outer flange is disposed at the outer circumference of the first shaft at a predetermined distance from the first end surface; and
the tubular structural portion and the first shaft are connected together through a cooperation of the first inner flange and the first outer flange.

15. The electric machine according to claim 14, wherein the guiding assembly further comprises a second inserting portion and a second socketing portion that are engaged with each other, the second inserting portion is disposed at the outer circumference of the first shaft near the first outer flange, the second socketing portion is disposed at the inner circumference of the tubular structural portion near the first inner flange, and the second socketing portion has an inner diameter larger than an inner diameter of the first inserting portion.

16. The electric machine according to claim 15, wherein the second socketing portion is formed by protruding in the radial direction from the inner circumference of the tubular structural portion, the second inserting portion is formed by protruding in the radial direction from the outer circumference of the first shaft, an outer circumference of the second inserting portion is matched with an inner circumference of the second socketing portion, and a fitting precision of the second inserting portion and the second socketing portion is higher than a fitting precision of the first inserting portion and the first socketing portion.

17. The electric machine according to claim 11, wherein the second rotatable body comprises an annular second adapter bracket, a second inner flange is disposed at an inner circumference of the second adapter bracket, a second outer flange is disposed at the outer circumference of the second shaft, and the second rotatable body and the second shaft are connected together through a cooperation of the second inner flange and the second outer flange.

18. The electric machine according to claim 17, wherein the first adapter bracket or the second adapter bracket is a rotor bracket; the rotor further comprises a plurality of magnetic pole modules disposed at an outer circumference of the rotor bracket; the rotor bracket comprises an adapter portion, two or more connecting arms distributed radially on an outer circumference of the adapter portion, and a rotor ring arranged coaxially with the two or more connecting arms; the magnetic pole modules are disposed at a mounting surface of the rotor ring; and each of the rotor ring and the connecting arms are provided as a hollow internal structural member.

19. The electric machine according to claim 18, wherein a plurality of mounting slots extending in the axial direction are disposed at the mounting surface of the rotor ring at intervals, the magnetic pole module comprises a substrate and at least one magnet steel disposed at the substrate, and mounting portions for matching with the mounting slots are disposed at a side of the substrate away from the magnet steel.

20. An assembling method for the electric machine according to claim 1, comprising:
disposing the first shaft around and at the outer circumference of the second shaft;
disposing the tubular structural portion of the first rotatable body around and at the outer circumference of the first shaft through the guiding assembly; and connecting the second rotatable body coaxially with the second shaft so that the second rotatable body is disposed around and at the outer circumference of the first rotatable body.

\* \* \* \* \*